(12) United States Patent
Gage

(10) Patent No.: US 8,462,737 B1
(45) Date of Patent: Jun. 11, 2013

(54) SYSTEM AND METHOD FOR A MIMO SPLIT-PHYSICAL LAYER SCHEME FOR A WIRELESS NETWORK

(75) Inventor: William Gage, Stittsville (CA)

(73) Assignee: Research In Motion Limited, Ontario (CA)

( * ) Notice: Subject to any disclaimer, the term of this patent is extended or adjusted under 35 U.S.C. 154(b) by 1205 days.

(21) Appl. No.: 12/163,165

(22) Filed: Jun. 27, 2008

(51) Int. Cl.
*H04W 4/00* (2009.01)
*H04L 12/28* (2006.01)
*H04L 12/56* (2006.01)

(52) U.S. Cl.
USPC .................. 370/334; 370/395.4; 370/468

(58) Field of Classification Search
USPC ............. 370/322, 324, 328, 329, 334, 338, 370/395.4, 465–468
See application file for complete search history.

(56) References Cited

U.S. PATENT DOCUMENTS

| | | | | |
|---|---|---|---|---|
| 6,141,352 A * | 10/2000 | Gandy | 370/463 |
| 6,330,438 B1 * | 12/2001 | McClelland et al. | 455/421 |
| 7,907,971 B2 * | 3/2011 | Salo et al. | 455/562.1 |
| 2005/0047497 A1 * | 3/2005 | Rubinstain et al. | 375/222 |
| 2006/0227726 A1 * | 10/2006 | Zuniga et al. | 370/254 |
| 2007/0008877 A1 * | 1/2007 | Rouffet et al. | 370/208 |
| 2007/0104283 A1 * | 5/2007 | Han et al. | 375/260 |
| 2007/0121745 A1 * | 5/2007 | Zuckerman et al. | 375/260 |
| 2007/0189248 A1 * | 8/2007 | Chang et al. | 370/338 |
| 2007/0266134 A1 * | 11/2007 | Shyy et al. | 709/223 |
| 2008/0232296 A1 * | 9/2008 | Shin et al. | 370/315 |
| 2008/0253327 A1 * | 10/2008 | Kohvakka et al. | 370/330 |
| 2008/0285669 A1 * | 11/2008 | Walton et al. | 375/260 |
| 2009/0080388 A1 * | 3/2009 | Rohfleisch et al. | 370/338 |
| 2010/0008344 A1 * | 1/2010 | Zuniga et al. | 370/338 |

(Continued)

FOREIGN PATENT DOCUMENTS

WO    WO 2007028252 A2 *    3/2007

OTHER PUBLICATIONS

Glenn, Matt, "Split Approach to 802.11 MAC Processing", *CommsDesign*, May 20, 2004, http://www.commsdesign.com/showArticle.jhtml?articieID=20600113.

(Continued)

*Primary Examiner* — Farah Faroul

(57) ABSTRACT

The present application describes a system and method for dynamically employing split-physical layer (PHY) functionality across multiple access heads to establish multiple paths between a client device (CD) and an access network in order to address one or more of the above described coverage issues. In some embodiments multiple input multiple output (MIMO) space-time coding is employed. Space-time coding may include contemporaneously transmitting one spatial stream or multiple spatial streams through each access head. In some embodiments macro diversity is also employed. Macro transmit diversity may include transmitting a same signal, consisting of one or more spatial streams, from one or more access heads such that a CD can use a strongest signal of the signals transmitted from at least one access head or diversity combining of two or more of the transmitted signals to recover the transmitted signal at the CD. Space-time coding may include contemporaneously receiving one spatial stream or multiple spatial streams through each access head. Macro receive diversity may include receiving a same signal from a CD at one or more access heads such that a strongest signal of the signals received at one or more access heads can be used to recover a signal or diversity combining of two or more of signals received at different respective access heads can be used to recover the transmitted signal.

19 Claims, 11 Drawing Sheets

U.S. PATENT DOCUMENTS

| | | | |
|---|---|---|---|
| 2011/0075748 A1* | 3/2011 | Novak et al. | 375/260 |
| 2011/0103316 A1* | 5/2011 | Ulupinar et al. | 370/329 |
| 2011/0305159 A1* | 12/2011 | Hofmann et al. | 370/252 |
| 2012/0013748 A1* | 1/2012 | Stanwood et al. | 348/192 |

OTHER PUBLICATIONS

Judge, Peter, "Wi-Fi heretic launches single channel voice WLAN", *TechWorld*, Apr. 25, 2005, http://www.techworld.com/mobility/features/index.cfm?featureid=1388.

Chase, David, "Code combining—A maximum-likelihood decoding approach for combining an arbitrary number of noise packets", *IEEE Transactions on Communications*, May 1985.

Golden, Glen et al., "Detection Algorithm and Initial Laboratory Results using the V-BLAST Space-Time Communication Architecture", *IEEE Electronics Letters*, Jan. 1999.

IEEE Computer Society et al., "IEEE Standard for Local and Metropolitan Area Networks Part 16: Air Interface for Fixed and Mobile Broadband Wireless Access Systems Amendment 2: Physical and Medium Access Control Layers for Combined Fixed and Mobile Operation in Licensed Bands and Corrigendum 1", *IEEE Standard 802.16e*, Feb. 28, 2006, total pp. 864.

International Standard, "Precision Clock Synchronization Protocol for Networked Measurement and Control Systems", *IEEE Standard 1588*, Sep. 2004, total pp. 158.

Telecommunication Standardization Sector of ITU (ITU-T), "Series G: Transmission Systems and Media, Digital Systems and Networks; Ethernet over Transport aspects—Quality and availability targets; Series Y: Global Information Infrastructure, Internet Protocol Aspects and Next-Generation Networks; Internet protocol aspects—Transport; Timing and synchronization aspects in packet networks", *International Telecommunication Union*, ITU-T Recommendation G.8261/Y.1361, May 2006, total pp. 64.

"Draft STANDARD for Information Technology—Telecommunications and information exchange between systems—Local and metropolitan area networks—Specific requirements Part 11: Wireless LAN Medium Access Control (MAC) and Physical Layer (PHY) specifications: Amendments, number>: Enhancements for Higher Throughput", *IEEE DRAFT Standard P802.11n*, D2.00, Feb. 2007, total pp. 498.

IEEE Computer Society et al., "IEEE Standard for Local and Metropolitan Area Networks: Media Access Control (MAC) Bridges", *IEEE Standard 802.1D*, Jun. 9, 2004, total pp. 281.

IEEE Computer Society et al., "IEEE Standard for Information technology—Telecommunications and information exchange between systems—Local and metropolitan area networks—Specific requirements Part 3: Carrier Sense Multiple Access with Collision Detection (CSMA/Device) Access Method and Physical Layer Specifications Amendment: Data Terminal Equipment (DTE) Power via Media Dependent Interface (MDI)", *IEEE Standard 802.3af*, Jun. 18, 2003, total pp. 133.

Burbank J. et al., "Network Time Protocol Version 4 Protocol and Algorithms Specification draft-ietf-ntp-ntpv4-proto-07", *RFC draft-ietf-ntp-ntpv4-proto*, May 2007, total pp. 97.

\* cited by examiner

SYSTEM AND METHOD FOR A MIMO SPLIT-PHYSICAL LAYER SCHEME FOR A WIRELESS NETWORK

FIELD OF THE INVENTION

The invention relates to a split physical (PHY) layer scheme for a multiple input multiple output (MIMO)-based wireless network.

BACKGROUND OF THE INVENTION

Providing a cost effective, robust communications infrastructure using wireless local area networking (WLAN) technologies is a challenge in enterprise office environments. For example, the area to be covered within the office environment is diverse in size and shape (e.g. corridors, stairwells, atriums, conference rooms, workstation cubicles, etc.). The transmission path between a WLAN-enabled client device and a WLAN access point may be obscured by the building infrastructure (e.g. walls, support columns, stairways), by office equipment (e.g. book cases, storage units, cubicle partitions, etc.), and by the office workers themselves. In addition, the transmission path may be affected by other equipment operating in the area (e.g. microwave ovens, cellular phones, other WLAN devices, etc.) producing interference that disrupts communications.

Some elements of the environment are fairly static (e.g. the supporting walls and columns of the building structure) and can be dealt with to some degree during initial planning and deployment of the WLAN system. Office equipment, decorations, banners and other furnishings come and go over the lifetime of the WLAN installation and can have an effect on WLAN operation that cannot be anticipated during the planning stages. Interference, whether intentional or unintentional, cannot be anticipated and must be dealt with as it occurs.

Unanticipated changes in the environment may be dealt with either by modifying the operating parameters of a transmission (e.g. the modulation scheme, the channel frequency), by adjusting the coverage pattern (e.g. through beamforming), or by finding an alternate path between the transmitter and receiver.

Traditionally, finding an alternate path in a WLAN environment means that the client device must look for another access point within range of its transmission. Normal operation of applications running on the client device may be disrupted during the time that it takes for the client device to find a new access point and to establish a connection through that access point.

MIMO technology—recently introduced into the 802.11 WLAN and into a number of cellular communications standards—provides another means for establishing multiple paths between an access point and a client device.

SUMMARY OF THE INVENTION

According to a first broad aspect of the invention, there is provided a method for use in a MIMO-based wireless network, the method comprising: in a centralized manner, performing at least some physical (PHY) layer functionality; in a distributed manner, performing at least some PHY layer functionality, which is distinct from the at least some physical PHY layer functionality performed in a centralized manner; wherein: performing at least some PHY layer functionality in a centralized manner comprises performing MIMO space-time coding/decoding; and performing at least some PHY layer functionality in a distributed manner comprises performing analogue modulation/demodulation.

In some embodiments, performing at least some PHY layer functionality in a centralized manner comprises at least one of: performing channel coding/decoding; performing digital modulation/demodulation; and performing constellation mapping/de-mapping.

In some embodiments the method further comprises: in a centralized manner, performing at least some media access control (MAC) layer functionality.

In some embodiments the method further comprises, in a centralized manner, performing at least one of: scheduling of transmissions; and selecting at least one technique from a set of techniques for processing a transmit/receive signal.

In some embodiments, performing analogue modulation/demodulation comprises performing orthogonal frequency divisional modulation (OFDM) modulation/demodulation.

In some embodiments the method further comprises in a centralized manner, providing synchronization signals to control the timing of wireless transmissions.

In some embodiments, performing at least some PHY layer functionality in a centralized manner comprises performing processing of a transmit signal according to at least one of the following techniques: a) macro-transmit diversity; b) spatial reuse; and c) spatial multiplexing.

In some embodiments, performing at least some PHY layer functionality in a centralized manner comprises performing processing of a receive signal according to at least one of the following techniques: a) macro-receive diversity; b) spatial reuse; and c) spatial multiplexing.

In some embodiments, performing at least some PHY layer functionality in a centralized manner is performed by a central radio controller and performing at least some PHY layer functionality in a distributed manner is performed by a plurality of remote access heads, each remote access head having a coverage pattern, the method further comprising: providing an overall coverage pattern formed collectively by the coverage patterns of each of the plurality of remote access heads that is configured for one or more of: tailoring the wireless coverage to the localized area provided by the plurality of remote access heads to a desired size and shape; providing more uniform SINR across containment region; minimizing undesirable signal leakage to areas outside of the containment region; dynamically selecting a subset of the plurality of remote access heads during each transmission opportunity in order to minimize frame error rate and/or to maximize throughput.

According to a second broad aspect of the invention, there is provided a MIMO-based wireless network system comprising at least one radio cluster, the radio cluster comprising: a radio controller configured to perform at least some physical (PHY) layer functionality in a centralized manner; and a plurality of remote access heads configured to be connected to the radio controller and wherein each remote access head is configured to perform at least some PHY layer functionality distinct from that which the radio controller is configured to perform, the plurality of remote access heads collectively providing coverage to a localized area; wherein: the at least some PHY layer functionality performed by the radio controller comprises MEMO space-time coding/decoding; and the at least some PHY layer functionality performed by one or more of the plurality of remote access heads comprises analogue modulation/demodulation.

In some embodiments, the at least some PHY layer functionality that the radio controller is configured to perform comprises at least one of: channel coding/decoding; digital modulation/demodulation; and constellation mapping/de-mapping.

In some embodiments, the radio controller is configured to perform, in a centralized manner, one or more of: scheduling transmission and receipt of packets;

and selecting at least one technique from a set of techniques for processing a transmit/receive packet.

In some embodiments, the analogue modulation/demodulation comprises orthogonal frequency divisional modulation (OFDM) modulation/demodulation.

In some embodiments, the radio controller communicates with the plurality of remote access heads using wired or unwired network links wherein: wired network link protocols include one or more of Ethernet, Infiniband, frame relay, and ATM; and unwired network link protocols include one or more of IEEE 802.11, IEEE 802.16, UWB, and point-to-point microwave.

In some embodiments, the radio controller is configured to provide synchronization signals to the plurality of remote access heads to control the timing of wireless transmissions.

In some embodiments, for communications transmitted to or received from the plurality of remote access heads, the radio controller is configured to perform processing of a transmission or received signal according to at least one of the following techniques: a) macro-transmit diversity; b) macro-receive diversity; c) spatial reuse for one or both of a transmit signal and a receive signal; d) spatial multiplexing for one or both of a transmit signal and a receive signal; and e) some combination thereof.

In some embodiments, the MIMO-based wireless network system is configured to operate in any one of: a wireless local area network; a wide area cellular network; and a wireless room-area network.

In some embodiments, for a given radio cluster, each remote access head of the plurality of remote access heads is connected to the radio controller:

directly via a point-to-point connection; or indirectly via a fan-out arrangement through one or more other remote access heads.

In some embodiments, the at least one radio cluster operates as a single frequency network.

In some embodiments, when the system includes more than one radio cluster and each radio cluster operates as a single frequency network, the system utilizes a frequency plan in allocating which radio clusters use which frequencies.

In some embodiments, the system further comprising a network link between the radio controller and each of the plurality of remote access heads, the network link configured to provide one or more of: facilities to transmit packets between the radio controller and each remote access head of the plurality of remote access heads; synchronization signals to be transmitted by the radio controller to each remote access head of the plurality of remote access heads; and electrical power to be provided by the radio controller to at least one remote access head of the plurality of remote access heads.

Some embodiments of the invention address the need for a more robust wireless infrastructure in enterprise office deployments and in wide area cellular network deployments.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the invention will now be described with reference to the attached drawings in which.

DETAILED DESCRIPTION OF THE EMBODIMENTS OF THE INVENTION

Figure 1:
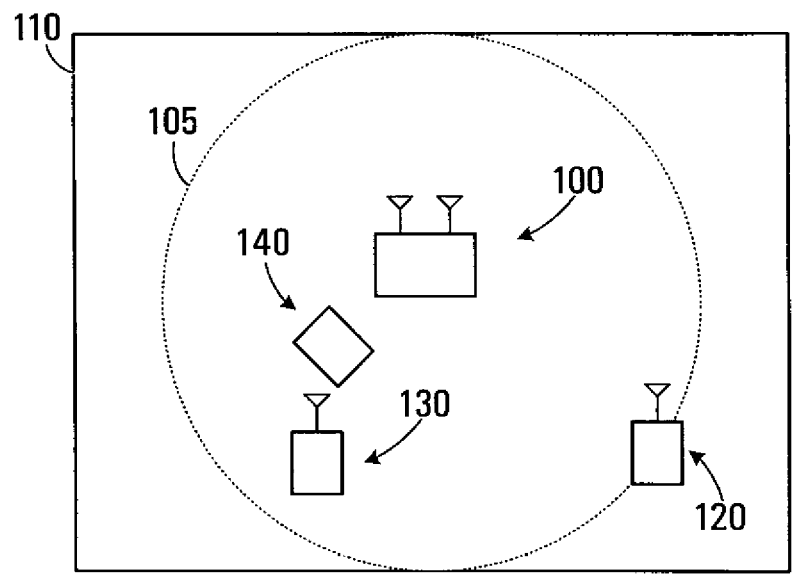
FIG. 1 is a schematic diagram of a conventional single access point providing coverage for a given area.

Reliability and consistent coverage are often cited as problems that plague current wireless network installations. Such problems can have many causes. For example, holes in a coverage area due to obstructions between a client device and a network access point. This is a particular problem when furniture, equipment, etc. is installed or moved after an initial installation of wireless network access points. Another cause is transient shadowing effects due to movement of people and objects within the coverage area. A further cause may be path loss due to the location of the client at some distance from the nearest wireless network access point, also known as "cell edge effect". Yet another cause may be interference, mostly unintentional, caused by other equipment operating on the same or an adjacent frequency close to the client device and/or the wireless network access point.

As an alternative to a conventional radio subsystem of a traditional wireless network Access Point (AP), embodiments of the invention provide a distributed radio cluster consisting of a central radio controller and a plurality of remote access heads. The central radio controller performs some PHY layer processing and provides a stream of space-time symbols to one or more of the plurality of remote access heads. Each remote access head performs additional PHY layer processing, distinct from that performed by the central radio controller. Each remote access head includes one or more antennas and hardware and/or software to enable transmission and receipt of signals to/from client devices and to/from the radio controller. While the access heads are described as being "remote" from the central radio controller, it is to be understood that at least one access head could be collocated with the central radio controller.

The present application describes a system and method for dynamically employing MIMO and macro diversity across multiple access heads to establish multiple paths between a client device (CD) and an access network in order to address one or more of the above described coverage issues. MIMO space-time coding may include transmitting one space-time stream or multiple space-time streams through each access head. Macro transmit diversity may include transmitting a same signal, consisting of one or more space-time streams, from one or more access heads such that a CD can use a strongest signal of the signals transmitted from at least one access head or diversity combining of two or more of the transmitted signals to recover the transmitted signal at the CD. MIMO space-time coding may include receiving one space-time stream or multiple space-time streams through each access head. Macro receive diversity may include receiving a same signal from a CD at one or more access heads such that a strongest signal of the signals received at one or more access heads can be used to recover a signal or diversity combining of two or more of signals received at different respective access heads can be used to recover the transmitted signal.

In addition, through dynamic spatial reuse and/or spatial multiplexing of traffic across multiple access heads, embodiments of this invention may provide better spectrum management and may increase the throughput and/or capacity of the overall system by transmitting to, or receiving from, several CDs in parallel.

Embodiments of the present invention employ macro diversity across multiple access heads to aid in improving reliability and mitigate coverage problems in wireless network installations.

Embodiments of the invention are generally described here with respect to a wireless local area network. However, this is not intended to limit the invention. In some embodiments, the methods, devices and systems described herein may be applied to wide area cellular networks and/or wireless room-area networks.

FIG. 1 illustrates a conventional wireless network AP 100 having two antennas, for micro receive diversity, providing coverage 105 in a defined area 110 from a central location in the defined area. A first client device (CD) 120 is shown at the edge of the area of coverage 105 and a second CD 130 is shown within the area of coverage 105. An obstacle 140 to a signal being received by CD 130 is also shown in FIG. 1. Providing coverage from a central location may result in degradation of the signal quality for a CD that is further away from the AP, such as with CD 120, and can result in loss of signal if there are obstructions between the AP and the target CD, such as with obstacle 140 and CD 130.

Figure 2:
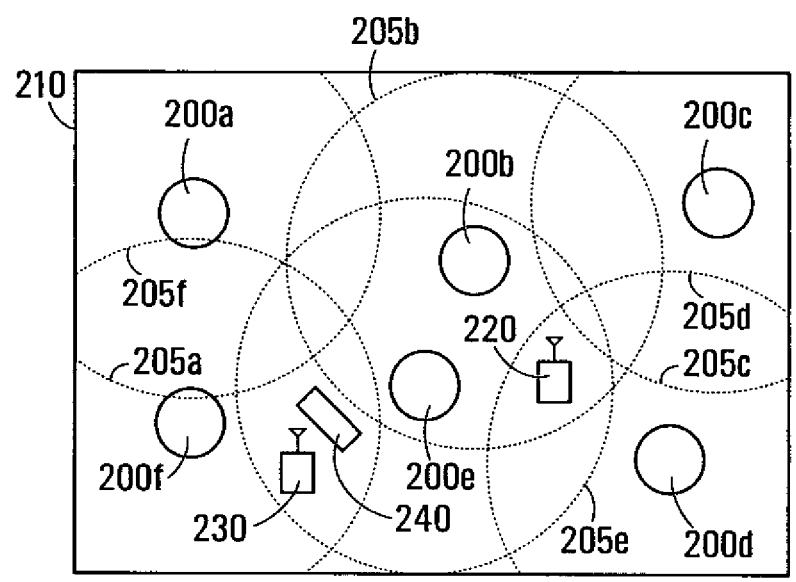
FIG. 2 is a schematic diagram of a group of access heads providing coverage for a given area in a distributed manner according to an embodiment of the invention.

Referring now to FIG. 2, an exemplary arrangement according to an aspect of the present invention will be described. The arrangement provides a radio cluster configured to replace the centralized one or more antennas of the AP used in the conventional wireless network AP of FIG. 1. The radio cluster in this example includes six access heads (AH) 200a-200f that are distributed throughout a defined area 210 and a radio controller (not shown) connected to all of the access heads. The AHs 200a-200f each have a respective coverage area 205a-205f. As can be seen from FIG. 2, there is overlap of coverage areas of adjacent access heads.

While six access heads are illustrated in the example of FIG. 2, the number of access heads is implementation specific. The number of access heads may depend on one or more factors such as, but not limited to, the area of coverage, obstacles within the coverage area and by the desired performance metrics of the radio cluster (e.g. SINR and/or throughput targets).

FIG. 2 also illustrates a first CD 220 shown within overlapping coverage areas 205b, 205d and 205e. A second CD 230 is shown within overlapping coverage areas 205e and 205f. A CD may be, but is not limited to, such devices as cellular telephone, wireless enabled computers, and wireless enabled personal data assistants (PDAs).

An obstacle 240 is also shown in FIG. 2 located between AH 200e and CD 230. Obstacle 240 may obstruct a signal transmitted by access head 200e intended for CD 230, but AH 200f still has an unobstructed, direct line of sight path to CD 230. Having multiple access heads configured to collectively provide coverage for a define region, such that one or more may transmit to/receive from a CD in this manner may allow improved signal reception over the case illustrated in FIG. 1, in which obstacle 140 obstructs a transmit signal in the direction of CD 130 from the only available signal source AP 100.

In a downlink transmission scenario (transmission sent from one or more access heads toward at least one CD) in which the radio cluster communicates with CD 220, the radio controller determines which access heads are able to communicate with CD 220. As access heads 200b, 200d, 200e are able to communicate with CD 220, the radio controller selects those particular access heads to transmit to CD 220. CD 220 receives signals from access heads 200b, 200d, 200e and either combines the signals received from two or more of the access heads using some form of diversity combining or uses only a single strongest signal received from one of the access heads. Contemporaneously, the radio controller may select access head 200f to transmit to CD 230 since obstacle 240 prevents access head 200e from communicating with CD 230.

On the downlink, the radio controller may instruct one or more access heads to simultaneously transmit information towards one or more CDs. At every downlink transmission opportunity, the radio controller may select from amongst a number of performance-enhancing techniques for performing transmit signal processing.

A first technique is macro-transmit diversity in which redundant information is transmitted by multiple access heads to a single CD. Redundant transmission of information may reduce the frame error rate (FER) seen by the CD thereby improving the quality of a radio link between one or more access head and CD.

A second technique is spatial reuse in which information is transmitted to different CDs by different access heads simultaneously within a given coverage area. The CDs and corresponding access heads to transmit to the CDs are selected so that the transmissions do not interfere with each other, thereby increasing the overall throughput of the system.

A third technique is spatial multiplexing in which multiple spatial streams are formed to transmit information to one CD or to multiple CDs by access heads with overlapping coverage. Allocating multiple spatial streams to one CD will increase the throughput experienced by that CD; allocating different streams to different CDs will increase the overall throughput of the system.

The various techniques described above may also be combined—for example, a given spatial stream may be scheduled for transmission by more than one access head, allowing the combined benefits of spatial multiplexing and transmit diversity to be realised, which has the effect of, in a given coverage area, transmitting to multiple CDs simultaneously from multiple AHs.

In some embodiments, an access head may have more than one antenna. The radio controller may provide different streams for transmission by one or more antennas of the access head. This may be performed by the radio controller sending streams addressed to individual antennas of the access head. One manner of considering such a scenario is that each group of one or more antennas transmitting a different stream than other antennas in the access head form a physically separate access head, in terms of the hardware/software used to implement the processing in the access head for each different stream. That is the hardware/software of multiple access heads could be packaged in a single physical entity and one or more of the access heads used as appropriate depending how many streams are received at the access head. Another manner of considering such a scenario is that each group of one or more antennas transmitting a different stream than other antennas in the access head is considered a virtual access head. That is the hardware/software of multiple access heads may be shared for processing the different streams for the access head.

In an uplink transmission scenario (transmissions received at one or more access head from at least one CD) in which CD 220 communicates with one or more access head of the radio cluster, access heads 200b,200d,200e are able to communicate with CD 220 and receive a signal from CD 220. The radio controller connected to access heads 200b,200d,200e can either combine the signals received by two or more of the access heads using some form of diversity combining or use only a single strongest signal received by one of the access heads. Contemporaneously, the radio controller may allow CD 230 to transmit to access head 200f since obstacle 240 prevents access head 200e from communicating with CD 230.

On the uplink, a transmission from a CD may be received by one or more access heads. The received information is forwarded to the radio controller by each access head. At every uplink transmission opportunity, the radio controller may select from amongst a number of performance-enhancing techniques for processing the received signal.

A first technique is macro-receive diversity in which information received by the radio controller from multiple access heads is combined. For example, the information may be combined using diversity combining techniques. Combining received signals from multiple access heads may reduce the frame error rate seen by the radio controller, thereby improving the quality of the radio link between the CD and the radio controller.

A second technique is spatial reuse in which information is received from different CDs by different access heads. The CDs and corresponding access heads that will receive from the CDs are selected so that the transmissions from the CDs do not interfere with each other, thereby increasing the overall throughput of the system.

A third technique is spatial multiplexing in which the spatial streams transmitted simultaneously by different CDs are coded to distinguish themselves when received by access heads with overlapping coverage thereby increasing the overall throughput of the system.

While only two CDs are illustrated in the example of FIG. 2, it is to be understood that any number of CDs may be operating within the area defined by the coverage of the access heads. The number of CDs within the coverage area of the access heads will vary as CDs migrate in and out of the coverage area. As a CD migrates within the coverage area, the radio controller may determine that different groups of one or more access heads will transmit to or receive from the CD.

From the perspective of a CD, the one or more of the plurality of access heads transmitting to or receiving from the CD operate collectively as though they were a single access point. In some embodiments, the distance between a given CD and a nearest access head is reduced as compared to the case of only a single Access Point used to cover an entire area. The reduced distance may improve signal quality by reducing propagation losses.

In some embodiments, neighbouring access heads may provide overlapping coverage, thereby providing alternate transmission paths to avoid obstacles. An example of this is access heads 200b,200d,200e in FIG. 2 providing overlapping coverage at the location of CD 220.

A decision on which set of access heads to use for communicating with the CD may be made by the radio controller as frequently as at every downlink and uplink transmission opportunity. The CD is unaware of the decisions made by the controller, as the CD sees the entire cluster as a single AP, so there is no disruption in the operation of applications on the CD. The controller is able to use its selection of access heads to adapt to movement of the CD and/or to conditions in the RF environment, which may experience rapidly changing conditions, in order to improve overall performance and capacity.

Figure 3:
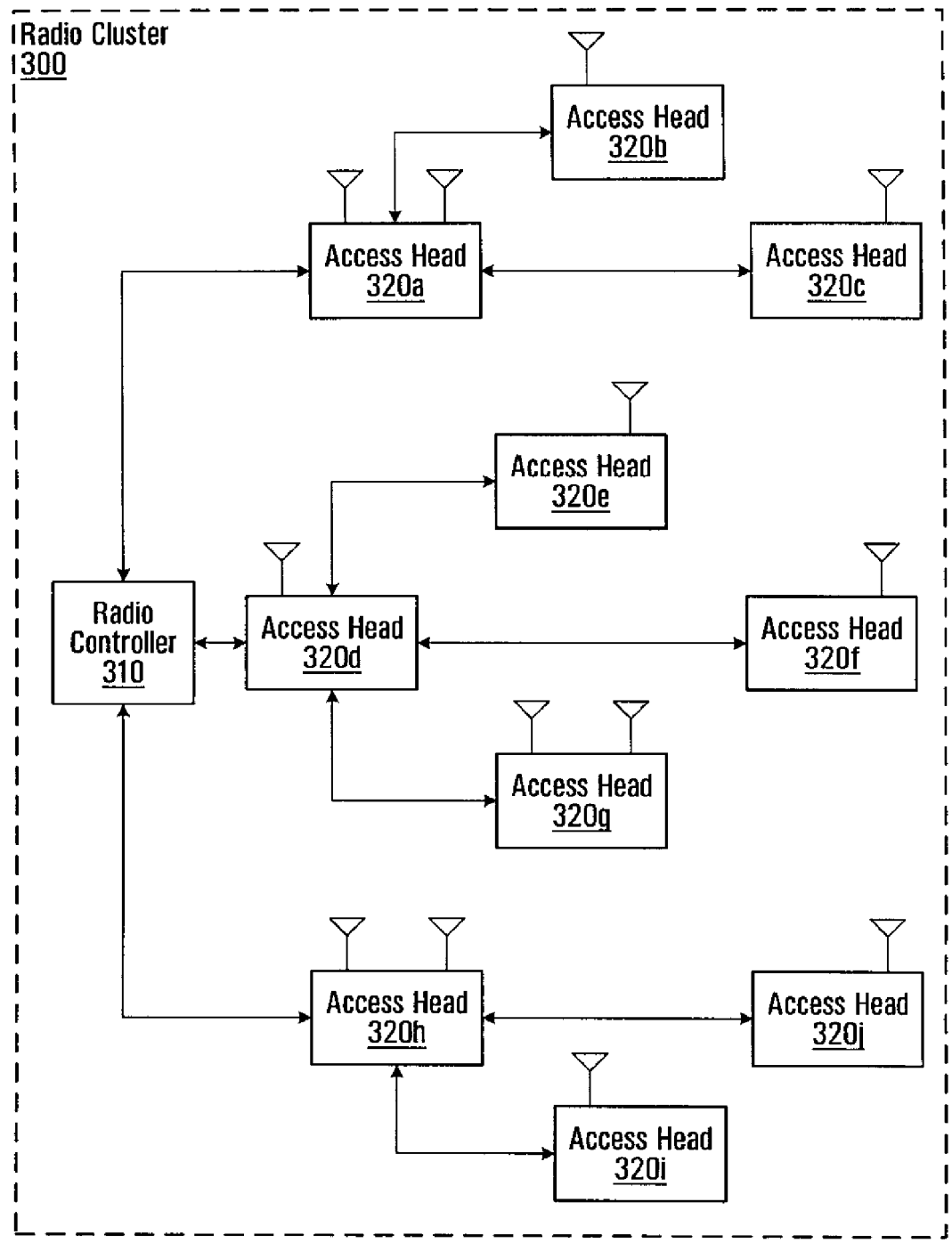
FIG. 3 is a schematic diagram of a radio cluster architecture including a radio controller and multiple access heads according to an embodiment of the invention.

With reference to FIG. 3 a more detailed example of a radio cluster will now be described. Radio cluster 300 includes a radio controller 310 and ten access heads 320a-320j. The radio controller 310 is connected to the access heads 320a-320j via network links. An access head may be connected to the radio controller directly via a point-to-point network link. In the illustrated example, this is represented by network links between radio controller 310 and access heads 320a, 320d and 320h, respectively. Alternatively, an access head may be connected to the radio controller indirectly via a fan-out arrangement through another access head. In the illustrated example, this is represented by a network link connecting radio controller 310 to access head 320a and network links between access head 320a and access head 320b and 320c, respectively, a network link connecting radio controller 310 to access head 320d and network links between access head 320d and access head 320e, 320f and 320g, respectively, and a network link connecting radio controller 310 to access head 320h and network links between access head 320h and access head 320i and 320j, respectively. In the illustrated example three access heads are shown connected directly point-to-point and seven connected by fan-out, but it is to be understood that such connections are implementation specific and will vary based on the desired configuration for a given coverage area.

The type of network link is implementation specific. In some embodiments, the radio controller 310 is connected to the access heads 320a-320j via standard data communications grade cables. A particular example of such a cable in an enterprise office environment is Category 5 unshielded twisted pair.

In some embodiments, the network link carries information in packets or frames, for example Ethernet frames that are exchanged between the radio controller and the access heads. In some embodiments, the network link carries timing synchronization signals between the radio controller 310 and the access heads. In some embodiments, the network link provides electrical power for the access heads. In some embodiments, the access heads are powered in an alternative manner than by using a power signal from the network link, for example the access heads may be plugged in to an electrical socket local to their placement.

In some implementations, the radio controller co-ordinates transmission of radio link packets and/or frames on the downlink. Transmission to one or more CDs may be via one or more access heads in the cluster, as determined by the radio controller. In some implementations, the radio controller correlates communication packets and/or frames received on the uplink. Reception from each CD may be via one or more access heads in the cluster, as determined by the radio controller.

There is a single radio controller per radio cluster in a non-redundant configuration. In some embodiments, more than one radio controller is included for the radio cluster to provide desired redundancy.

An access head contains one or more antennas. In FIG. 3 access heads 320a, 320g and 320h are shown to have two antennas and other access heads are shown to have a single antenna. The number of antennas per access head is implementation specific.

The access heads contain hardware/circuitry for transmitting and receiving signals. In some implementations this includes, but is not limited to, circuitry to convert between an analogue signal passed to and from a CD over a wireless radio link and a digital signal passed to and from the radio controller over the wireless network infrastructure.

FIG. 3 illustrates an example of a single radio cluster 300. In some embodiments, more than one radio cluster can be included in a system in which each radio cluster is arranged to cover a specific area. For example, a system having multiple radio clusters may be a multi-floor office building in which each floor of the office building has it own radio cluster. Some floors may even be subdivided such that multiple radio clusters operate on one or more of the floors.

In some embodiments, the radio cluster operates as a single frequency network (SFN). In an SFN every access head within a given radio cluster transmits and receives information on the same RF channel. In some embodiments, different radio clusters operate on different RF channels according to a desired frequency plan, in order to minimise interference between radio clusters.

Figure 4:
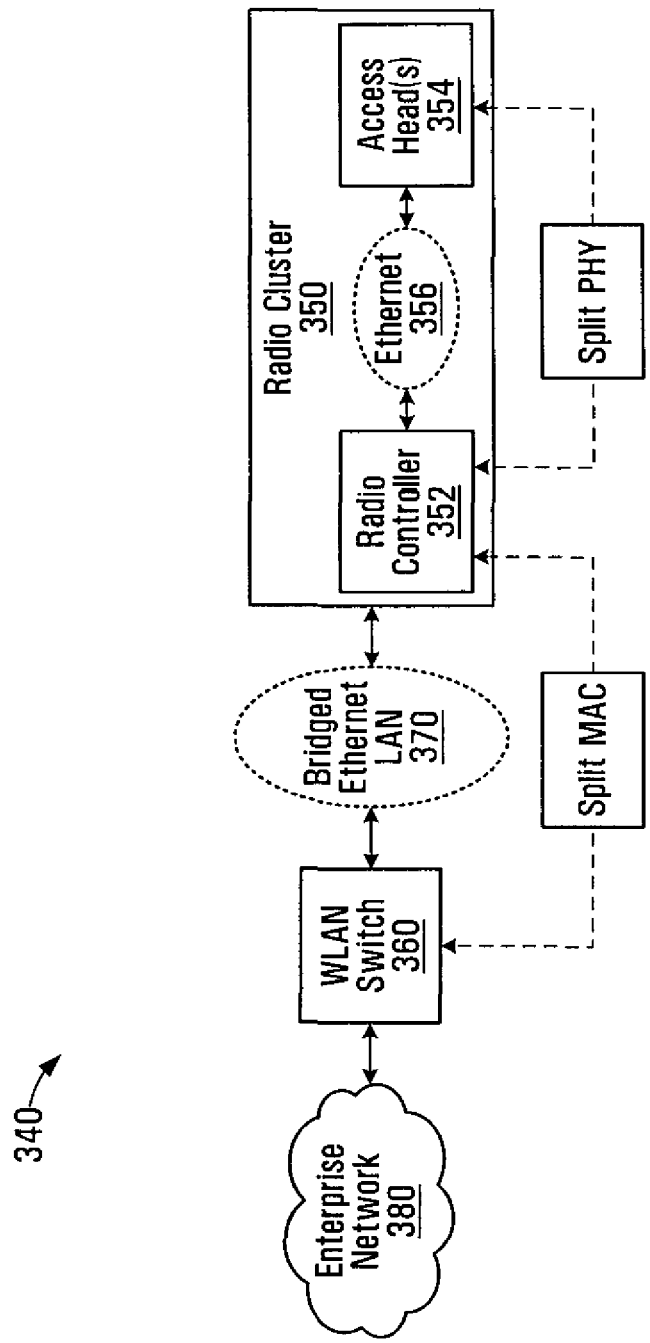
FIG. 4 is a block diagram of a wireless local area network (WLAN) topology having a single radio cluster illustrating MAC and PHY functional partitioning according to an embodiment of the invention.

FIG. 4 illustrates an enterprise network topology 340 having a single radio cluster 350. The radio cluster 350 includes a radio controller 352 and a plurality of access heads 354. The network links between the radio controller and plurality of access heads in the radio cluster 350 are illustrated to be Ethernet based links 356. The use of Ethernet based links as shown in FIG. 4 is for example purposes and is not intended to limit the type of network links that could be used. In alternative embodiments, for example in an office environment, the network links may be a high speed wired link like Infiniband, UWB or point-to-point microwave. In a wide area environment, it may be frame relay or ATM or (metro) Ethernet, possibly over microwave facilities.

In FIG. 4, the radio cluster 350 is connected to a WLAN switch 360 via a bridged Ethernet LAN 370. The WLAN switch 360 interfaces with a larger overall network 380 allowing the forwarding of packets to and from the radio cluster that is currently serving a given CD. In the illustrated example the network is an enterprise network.

Some embodiments of the invention partition functionality defined in the physical (PHY) layer of a MIMO-based product across multiple network elements. In some embodiments of the present invention, responsibility for the PHY functionality within a radio cluster is split between the radio controller 352 and each of the access heads of the plurality of access heads 354. This is indicated in FIG. 4 as "Split PHY". Within the radio cluster 350, the radio controller 352 implements packet data unit (PDU) coding and modulation scheme (e.g. QPSK, QAM) functionality, as well as MIMO space-time coding functionality. The plurality of access heads 354 implement PHY modulator and demodulator functionality, such as that based on OFDM (orthogonal frequency division multiplexing), as well as antenna subsystem functionality for the radio cluster.

In some embodiments of the invention, a split-MAC (media access control) architecture is implemented. In a split-MAC architecture, MAC functionality is split between the WLAN switch 360 and the radio controller 352 within the radio clusters 340. This is indicated in FIG. 4 as "Split MAC".

In the split-MAC arrangement, the WLAN switch 360 implements the so-called "Upper MAC" functionality. The "Upper MAC" functionality is, such as, but not limited to, management and control procedures of the MAC protocol stack. The radio controller 352 implements "Lower MAC" functionality, such as, but not limited to, scheduling, access control, automatic repeat requests, etc.

Figure 5A:
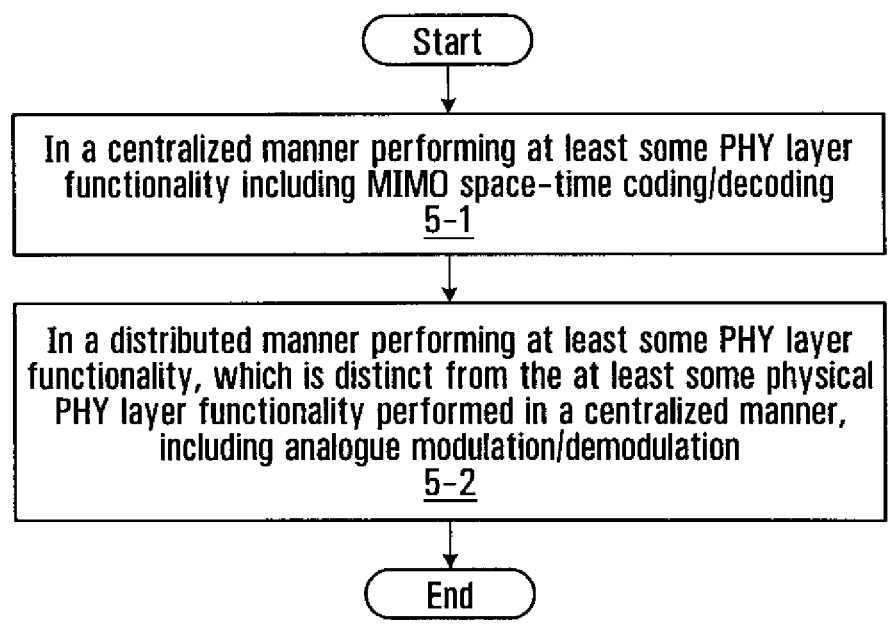
FIG. 5A is a flowchart illustrating a method for providing MIMO split-physical (PHY) layer functionality according to an embodiment of the invention.

A method for implementing a MIMO split-PHY architecture will now be described with reference to FIG. 5A. FIG. 5A illustrates a flow chart for a method for use in a MIMO-based wireless network. A first step 5-1 of the method includes in a centralized manner, performing at least some physical (PHY) layer functionality including MIMO space-time coding/decoding. A second step 5-2 involves in a distributed manner, performing at least some PHY layer functionality, which is distinct from the at least some physical PHY layer functionality performed in a centralized manner, including analogue modulation/demodulation. The plurality of remote locations collectively provide wireless coverage to a localized area.

In some embodiments, performing at least some PHY layer functionality in a centralized manner involves performing channel coding/decoding. In some embodiments, performing at least some PHY layer functionality in a centralized manner involves performing digital modulation/demodulation and constellation mapping/de-mapping.

In some embodiments, performing at least some PHY layer functionality in a centralized manner involves performing processing of a transmit signal according to at least one of the following techniques: a) macro transmit diversity; b) spatial reuse; and c) spatial multiplexing.

In some embodiments, performing at least some PHY layer functionality in a centralized manner involves performing processing of a receive signal according to at least one of the following techniques: a) macro receive diversity; b) spatial reuse; and c) spatial multiplexing.

In some embodiments the method further involves in a centralized manner, providing synchronization signals to control the timing of wireless transmissions.

In some embodiments, performing analogue modulation/demodulation involves performing orthogonal frequency divisional modulation (OFDM) modulation/demodulation.

In some embodiments, the method further involves performing in a centralized manner at least some media access control (MAC) layer functionality. In some embodiments, performing at least some MAC layer functionality in a centralized manner involves performing scheduling of transmissions, controlling access and controlling automatic repeat requests.

Figure 5B:
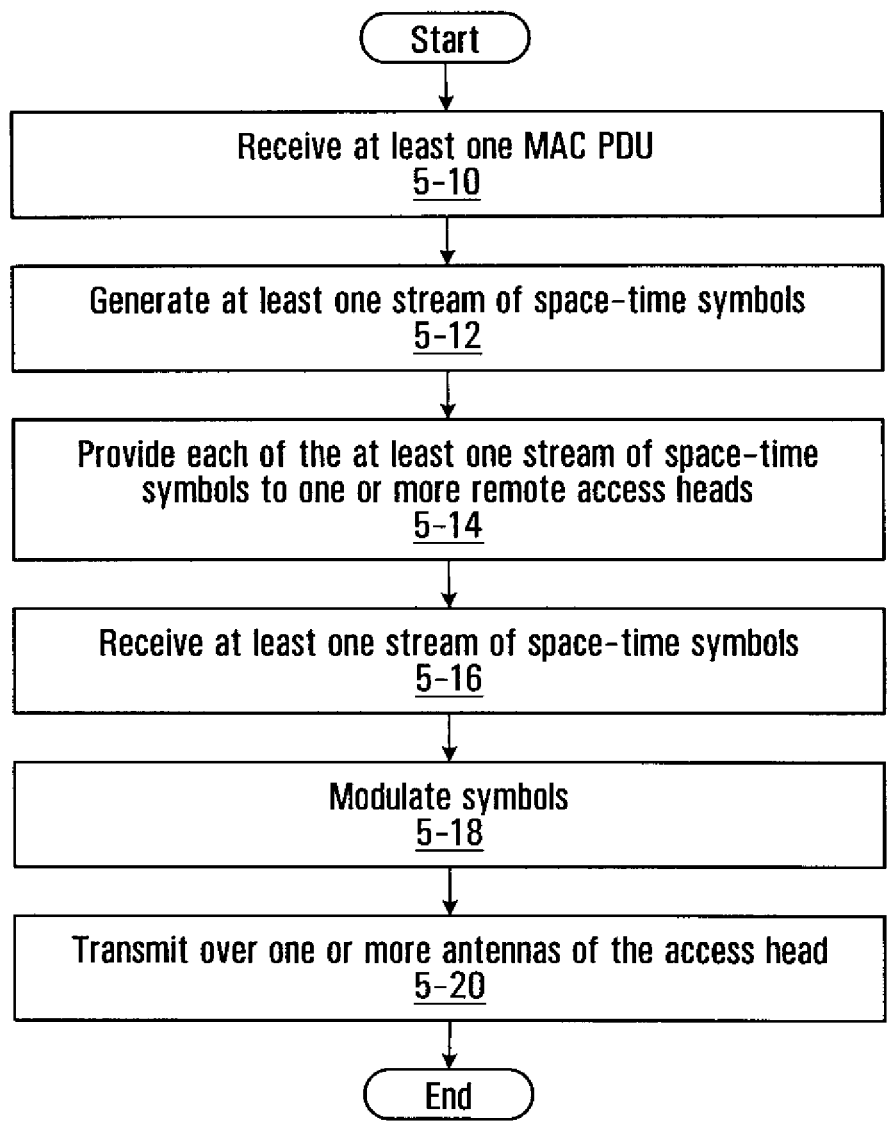
FIG. 5B is a flowchart illustrating an example of a method for providing MIMO split-PHY layer functionality according to another embodiment of the invention.

A detailed example of a method for implementing a MIMO split-PHY architecture will now be described with reference to FIG. 5B. FIG. 5B illustrates a flow chart for a method for downlink communication in a MIMO-based wireless network. For downlink communication from the radio controller via one or more access heads to a CD initial steps are performed by the radio controller. A first step 5-10 involves the radio controller receiving at least one media access control protocol data unit (MAC PDU) for transmission to at least one CD. A subsequent step 5-12 involves generating at least one stream of space-time symbols from the at least one MAC PDU. Generating the at least one stream includes space-time coding and may include performing other processing steps, such as, for example, channel encoding and/or digital modulation. A further step 5-14 performed by the radio controller is providing the at least one stream of space-time symbols to one or more remote access heads. A further step performed by the radio controller may include selecting which techniques i.e. macro-transmit diversity, spatial reuse, spatial multiplexing, will be used for processing the at least one MAC PDU.

Following the steps performed at the radio controller, the access heads perform additional steps prior to transmitting the signal to at least one CD. A first step 5-16 performed at an access head intended to receive at least one space-time stream of symbols from the radio controller involves receiving at least one stream of space-time symbols. After the stream of space-time symbols is received, a further step 5-18 involves the access head that received the stream of space-time symbols modulating the symbols. In some embodiments, the modulation may be OFDM based modulation. An additional step 5-20, after the symbols are modulated, involves the access head transmitting the modulated symbols from one or more access head antennas to the CD for which the original MAC PDU was intended.

Figure 5C:
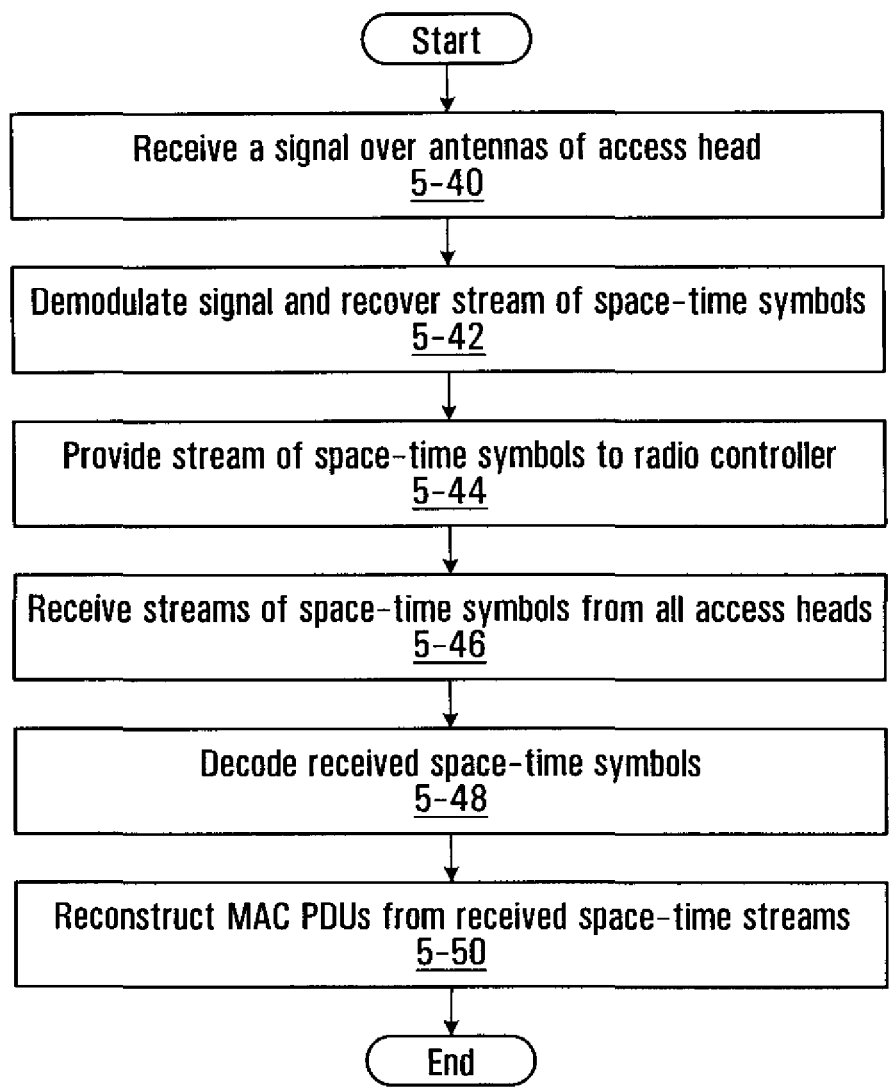
FIG. 5C is a flowchart illustrating an example of a method for providing MIMO split-physical (PHY) layer functionality according to a further embodiment of the invention.

Another detailed example of a method for implementing a MIMO split-PHY architecture will now be described with reference to FIG. 5C. FIG. 5C illustrates a flow chart for a method for uplink communication in a MIMO-based wireless network. For uplink communication from at least one CD via one or more access heads to the radio controller, initial steps are performed by the access heads. A first step 5-40 involves, at one or more of the access heads, receiving a signal on the access head's antennas. A subsequent step 5-42 involves the access head that received the signal demodulating the signal so as to recover a stream of space-time symbols. In some embodiments the received signal is an OFDM signal and the demodulation is OFDM demodulation. A further step 5-44 performed by the access head is providing a recovered stream of space-time symbols to the radio controller.

Following the steps performed at each of one or more access heads, the radio controller performs additional steps. A first step 5-46 at the radio controller involves receiving streams of space-time symbols from each of the access heads. After the streams of symbols are received, a further step 5-48 involves the radio controller decoding the space-time streams of symbols. An additional step 5-50, after the symbols are recovered involves the radio controller reconstructing MAC PDUs from the decoded space-time streams. Reconstructing the MAC PDUs may involve further processing such as channel decoding and/or digital demodulation and/or error correction.

Each access head may also be configured to provide a different coverage pattern in order to tailor the illumination provided by the radio cluster to the size and shape of the containment region. Particular examples will be described referring to FIGS. 6A and 6B.

Figure 6A:
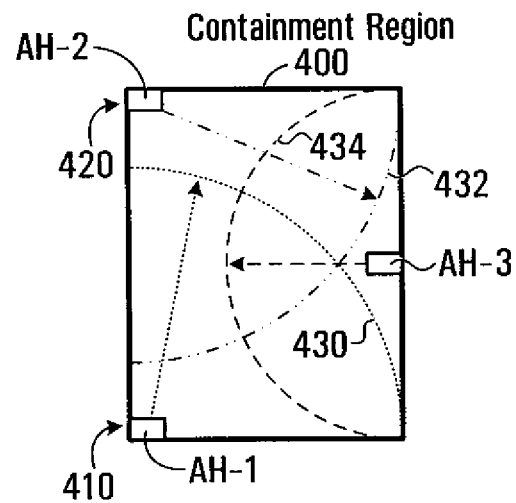
FIGS. 6A and 6B are schematic diagrams illustrating examples of customized radio cluster antenna pattern layouts for specifically shaped coverage areas.

In FIG. 6A, a rectangular containment region 400 (e.g. a room) is illuminated from two adjacent corners 410,420 using a first access head AH-1 in one corner 410 and a second access head AH-2 in the other corner 420 that each provide a 90 degree coverage pattern, indicated by reference characters 430 and 432, respectively. A third access head AH-3 is located on a wall opposite to a wall shared by the two adjacent corners 410,420. The third access head AH-3 provides a 180 degree coverage pattern 434 from the middle of the wall. This collection of groups may result in more uniform coverage and, hence, more predictable service by providing overlapping coverage in those areas of the containment region that are furthest from an access head. Macro diversity may also be used to transmit redundant information on two or more of the AHs and/or receive from each CD on two or more of the AHs, as determined by the radio controller. The selected coverage pattern of the three access heads may reduce inter-cluster interference by minimising signal strengths seen outside the desired containment area.

Figure 6B:
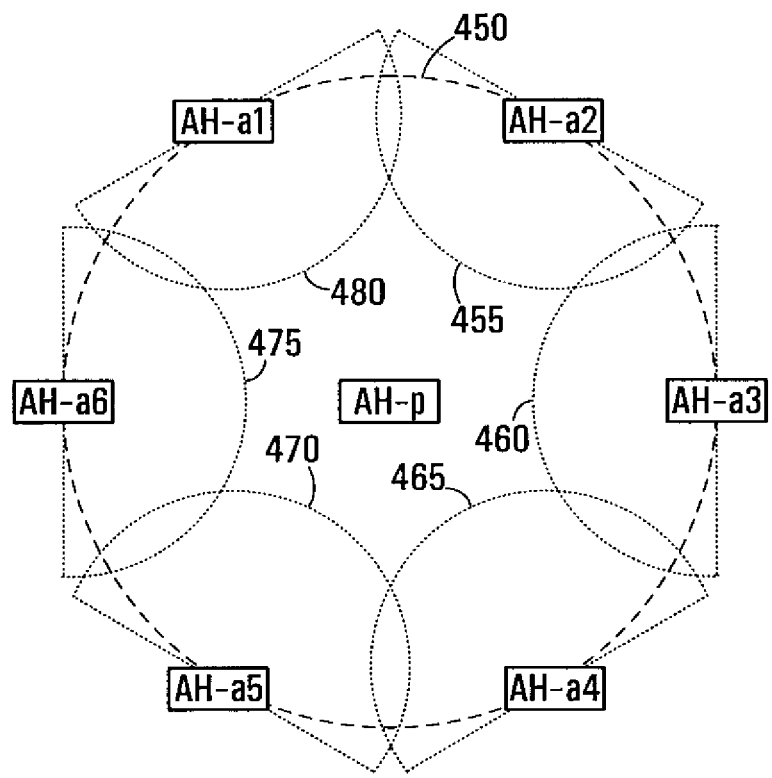

FIG. 6B shows another example of a coverage strategy with a first access head AH-P providing 360 degree omnidirectional coverage over a given region 450. Six auxiliary access heads AH-a1 to AH-a6 provide fill-in coverage using lower power, 180 degree coverage, indicated by reference characters 455,460,465,470,475,480, from the edge of region 450. This kind of illumination pattern eliminates many of the problems typically arising from propagation loss at the edge of a cell. Spatial reuse gains can also be realised by, for example, simultaneously transmitting different spatial streams to CDs within the coverage areas of AH-a1, AH-a3 and AH-a5. In such an example, the controller may or may not further decide not to transmit anything from AH-a2, AH-a4 and AH-a6 in order to minimise the interference seen in AH-a1, AH-a3 and AH-a5.

Any of the methods described above in FIG. 5A, 5B or 5C may further involve providing an overall coverage pattern formed collectively by the coverage patterns of each of the plurality of remote access heads, the overall coverage pattern being configured for one or more of: tailoring the wireless coverage to the localized area provided by the plurality of remote access heads to a desired size and shape; providing more uniform SINR across containment region; minimizing undesirable signal leakage to areas outside of the containment region; dynamically selecting a subset of the plurality of remote access heads during each transmission/receive opportunity in order to minimize frame error rate and/or to maximize throughput.

A wireless network may be comprised of multiple radio clusters. An example of a network topology having multiple radio clusters will be described with regard to FIG. 7.

Figure 7:
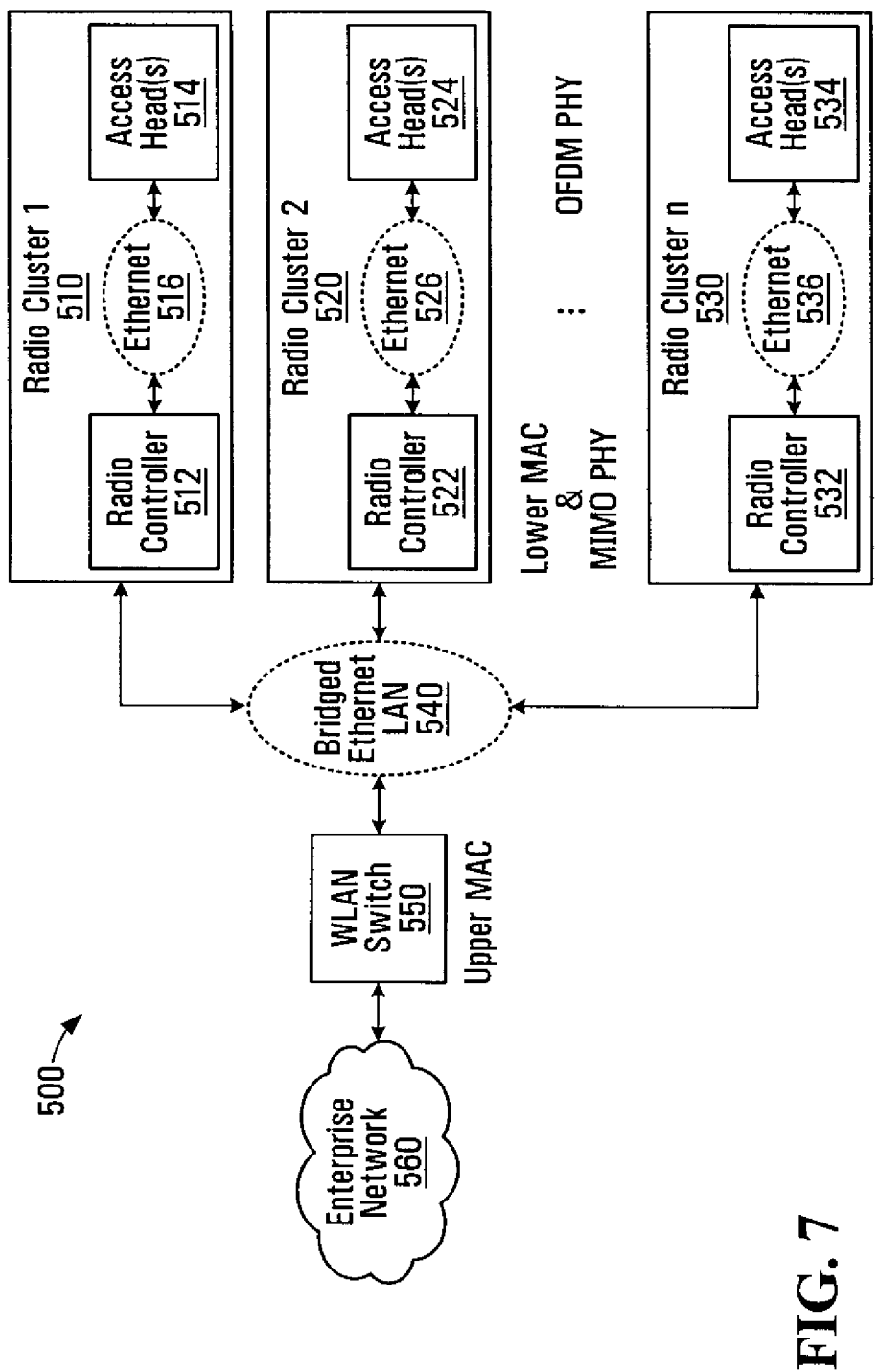
FIG. 7 is a block diagram of a wireless local area network (WLAN) topology having multiple radio clusters illustrating MAC and PHY functional partitioning according to an embodiment of the invention.

FIG. 7 is similar to FIG. 4, but includes multiple radio clusters. FIG. 7 illustrates a wireless network topology 500 having three radio clusters 510,520,530. Each radio cluster includes a radio controller 512,522,532 and a plurality of access heads 514,524,534. The links between the radio controller and plurality of access heads in each radio cluster are illustrated to be Ethernet based network links 516,526,536. The radio clusters 510,520,530 are connected to a WLAN switch 550 via a bridged Ethernet LAN 540. The WLAN switch 550 interfaces with a larger overall network 560 allowing the forwarding of packets to and from a given radio cluster that is currently serving a given CD. In the illustrated example the overall network is an enterprise network.

Some embodiments of the invention partition functionality defined in the PHY layer of a MIMO-based product across multiple network elements. In some embodiments of the present invention, responsibility for the PHY functionality within a radio cluster is split between the radio controller and each of the access heads. Within each radio cluster 510,520, 530, the radio controllers 512,522,532 implement packet data unit (PDU) coding and digital modulation scheme (e.g. QPSK, QAM) functionality, as well as MIMO space-time coding functionality. This is indicated in FIG. 7 as "MIMO PHY". The access heads 514,524,534 implement PHY layer modulator and demodulator functionality such as OFDM and antenna subsystem functionality for the radio cluster. This is indicated in FIG. 7 as "OFDM PHY".

Timing information may be distributed by the radio controller 512,522,532 to the remote access heads 514,524,534 using a clock synchronization method. The clock synchronization method is implementation specific. A particular example of a clock synchronization method is one that is consistent with IEEE 1588 or with ITU-T G.8261.

All of the access heads within a radio cluster are synchronized to maximise performance for both downlink and uplink operations. The radio controller acts as a master clock source for the radio cluster. The radio controller clock may be generated by a local electrical circuit or it may be derived from a precision timing signal supplied by an entity elsewhere in the network.

Timing information is periodically sent from the radio controller to each of the access heads. Each access head recovers this timing information to drive its own local clock and to synchronise that clock with one used by the radio controller. Precision timing information may be delivered either through packet-based protocols or through physical layer synchronization. The latter technique is typically used when the access heads are directly connected to the radio controller via a point-to-point network link while the former technique may be used when an access head is either directly connected via a point-to-point link or connected indirectly via a fan-out arrangement through another access head.

In some embodiments of the invention, a split-MAC (media access control) architecture is implemented. In a WLAN split-MAC architecture, MAC functionality is split between the WLAN Switch 550 and the radio controller 512,522,532 within each of the radio clusters 510,520,530.

In some embodiments, the connection between the radio controller and the access heads may use Ethernet bridging protocols. In some embodiments, Ethernet framing procedures are used over a simplified and dedicated fan-out network. Bridged Ethernet networks often use a number of general purpose management and control protocols for topology discovery, service discovery, multicast group management, etc. A "simplified and dedicated fan-out network" is intended to describe a network with the ability to forward Ethernet data frames, but does not necessarily support such general purpose protocols.

The use of bridged Ethernet networks is an example of a type of network on which some embodiments of the invention may operate and is not intended to limit the type of network. In alternative embodiments, technologies such as Infiniband, frame relay, ATM and (metro) Ethernet over copper, fibre or microwave may be appropriate.

Figure 8:
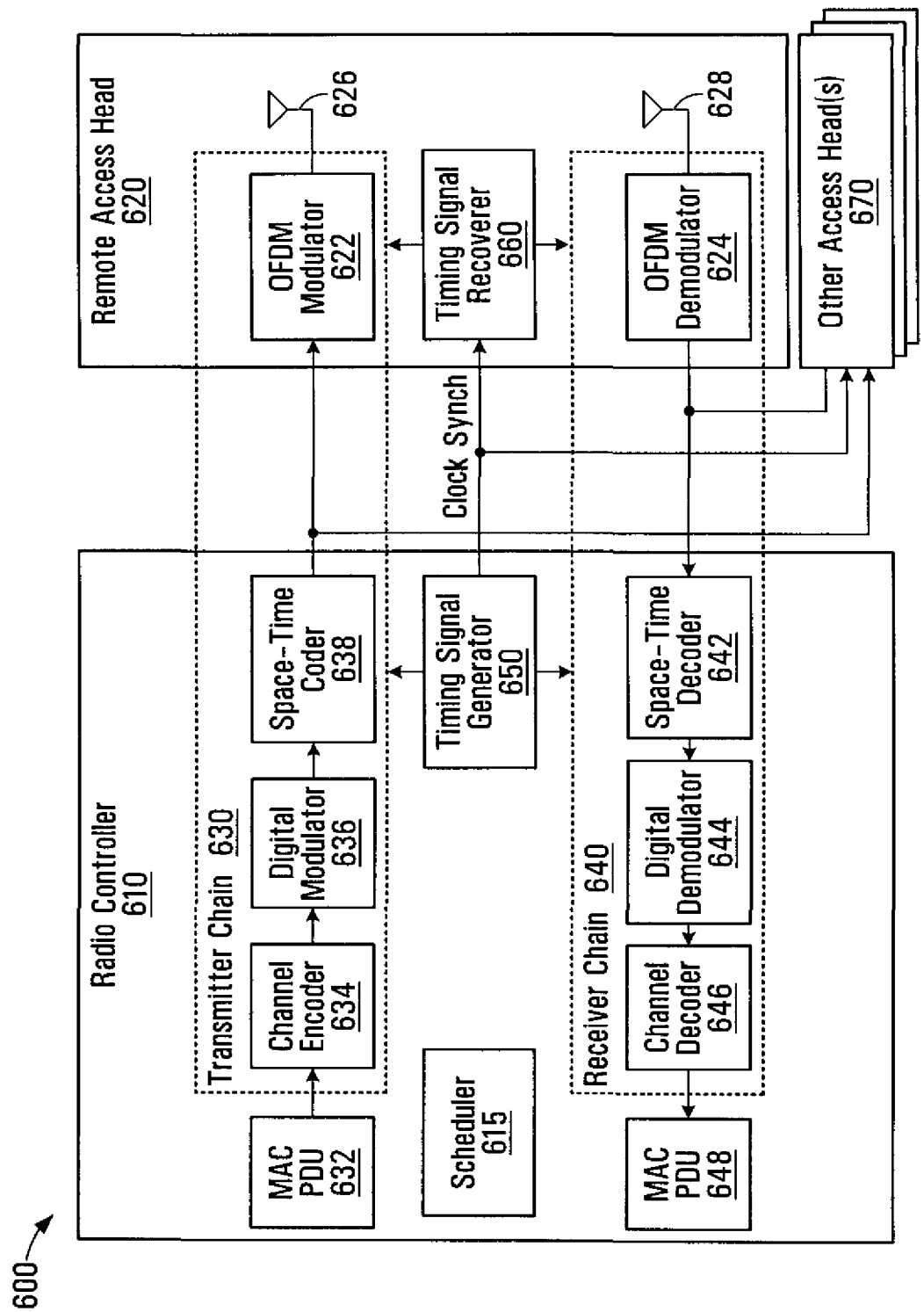
FIG. 8 is a block diagram of transmitter and receiver chains in the radio cluster according to an embodiment of the invention.

A further detailed example of a radio cluster including a radio controller and access heads will be described with reference to FIG. 8. No CDs are shown in FIG. 8, but their presence is implied.

A transmitter chain 630 and a receiver chain 640 are each formed by a respective collection of elements in the combination of the radio controller 610 and a plurality of access heads 620, 670. Only a single access head 620 is shown in detail. The transmitter chain 630 includes a channel encoder 634, a digital modulator 636 and a space-time coder 638 in the radio controller 610 and an OFDM modulator 622 in the access head 620. The receiver chain 640 includes an OFDM demodulator 624 in the access head 620 and a space-time decoder 642, a digital demodulator 644 and a channel decoder 646 in the radio controller 610.

The radio controller 610 includes a timing signal generator 650 for providing timing information to the transmitter chain 630 and to the receiver chain 640 in the combination of radio controller 610 and access head 620, as well as for the transmitter and receiver chains in the combinations of the radio controller 610 with the other access heads 670.

The radio controller 610 includes a scheduler 615 for scheduling downlink transmission by the combination of the radio controller 610 and respective access heads 620,670 and for scheduling uplink transmission by CDs (not shown) within the coverage area of the radio cluster.

Each access head, as will be described with specific reference to access head 620, includes a timing signal recoverer 660 configured to correspond with the timing signal generator 650 in radio controller 610. The timing signal recoverer 660 is configured to correspond with OFDM modulator 622 and OFDM demodulator 624 in access head 620. Connected to the OFDM modulator 622 is an antenna for transmitting to CDs. Connected to the OFDM demodulator 624 is an antenna for receiving from CDs. While only a single antenna is illustrated, it is to be understood that there may be one, two or more antennas coupled to each of the OFDM modulator 622 and OFDM demodulator 624.

While the illustrated example shows the radio controller 610 having a channel encoder 634, a digital modulator 636, a space-time coder 638, a space-time decoder 642, a digital demodulator 644 and a channel decoder 646, not all of these functionalities may be used in all embodiments of the invention for processing a frame/packet for transmission to the CD.

In some embodiments the scheduler or another dedicated function may be responsible for selecting which functionalities and/or performance-enhancing techniques, i.e. macro-transmit diversity, macro-receive diversity, spatial reuse, spatial multiplexing, will be used for processing the frame/packet.

Operation of the transmit chain and receive chains will now be described for a particular example based on IEEE 802.11n standard with reference to FIG. 8. It is to be understood that embodiments of the invention may be applied to networks other than those compliant with IEEE 802.11n.

Transmit Chain Operations (Towards a Client Device)

A MAC protocol data unit (MPDU) 632—an 802.11n control, management or data frame—is selected for transmission by the scheduler 615 residing in the radio controller 610. The MPDU 632 may have been received from a WLAN switch or it may have been generated internally by a lower layer MAC function residing in the radio controller 610. The channel encoder 634 prepares the MPDU 632 for transmission over a radio channel between the access heads 620,670 and a target CD through the addition of PHY information elements (e.g. header) and frame protection elements (e.g. FEC). In some embodiments, preparing the transmission may also include scrambling and/or interleaving the bit stream of the MPDU 632. A resulting PHY protocol data unit (PPDU) is mapped onto a spatial stream and segmented into a sequence of fixed length bit blocks according to a selected modulation scheme (e.g. 6-bit blocks for 64QAM) by digital modulator 636. Also in digital modulator 636, each bit block is mapped onto a constellation point of the modulation scheme and converted to an equivalent complex number.

Based on information provided by one or more access heads 620,670 that previously received information from the target CD, the scheduler 615 selects a set of access heads that will be used to transmit to the target CD. In some embodiments, the scheduler 615 determines which of the performance-enhancing techniques described above, macro transmit diversity, spatial reuse and spatial multiplexing, are applied during the downlink transmission opportunity.

The spatial streams scheduled for contemporaneous transmission by a set of access heads are processed by the space-time coder 638 in the radio controller 610 to produce a set of space-time streams. Each space-time stream is sent by the radio controller 610 to one or more access heads 620,670 where it is modulated onto OFDM carriers by the OFDM modulator 622 and transmitted over the radio link via antenna 626.

Figure 9:
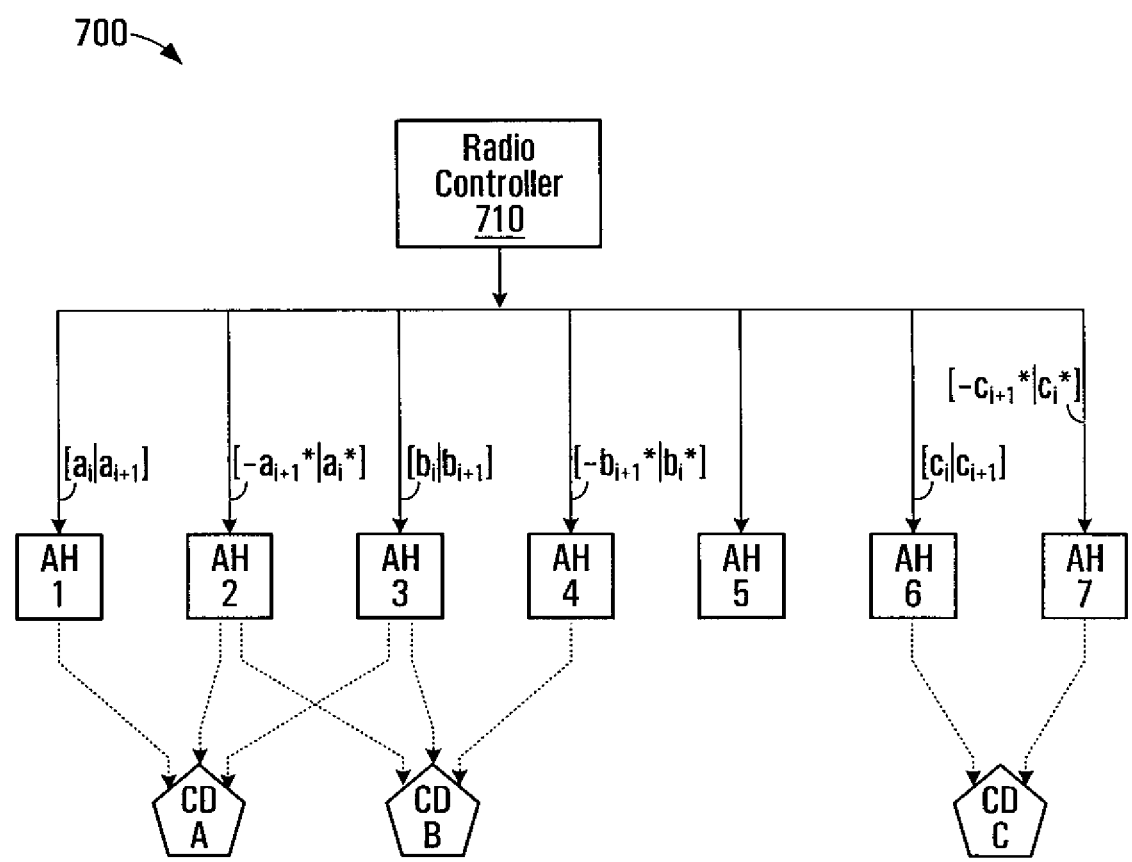
FIG. 9 is a schematic diagram of downlink transmission in an example radio cluster including a radio controller, multiple access heads and multiple client devices.

A particular example of preparing a transmission in a radio cluster will now be described with reference to FIG. 9. FIG. 9 illustrates a radio cluster 700 including a radio controller 710 connected to seven access heads identified as AH-1-AH-7. At a given point in time, three client devices CD-A, CD-B and CD-C are within the coverage area of the radio cluster 700. CD-A is within range of, and receives downlink communication from, access heads AH-1, AH-2 and AH-3. CD-B is within range of, and receives downlink communication from, access heads AH-2, AH-3 and AH-4. CD-C is within range of, and receives downlink communication from, access heads AH-6 and AH-7. Access head AH-5 is currently not communicating with any CDs.

Client Device A (CD-A) is within the coverage areas of AH-1, AH-2 and AH-3, which comprise the serving set of CD-A—i.e.

$\{CD-A\}_{serving}=\{AH-1, AH-2, AH-3\}$.

Similarly for CD-B and CD-C:

$\{CD-B\}_{serving}=\{AH-2, AH-3, AH-4\}$ and
$\{CD-C\}_{serving}=\{AH-6, AH-7\}$.

At the start of a downlink transmission opportunity, a scheduler in the radio controller 710 determines that {CD-C} serving does not overlap with $\{CD-A\}_{serving}$ or with $\{CD-B\}_{serving}$ thereby allowing transmissions to CD-C to occur without interference from other access heads and providing spatial reuse. Therefore, a transmission set, that is the set of access heads that will transmit to a CD, for CD-C is set equal to the serving set of CD-C:

$\{CD-C\}_{Tx}=\{CD-C\}_{serving}=\{AH-6, AH-7\}$.

Since the serving sets of CD-A and CD-B are overlapping, the serving sets of CD-A and CD-B are combined to form a transmission set:

$\{CD-A+CD-B\}_{Tx}=\{AH-1, AH-2, AH-3, AH-4\}$.

The scheduler of the radio controller can now treat transmission set $\{CD-A+CD-B\}_{Tx}$ as a 4-branch MIMO transmission chain, i.e. the radio controller and the four transmit access heads AH-1,AH-2,AH-3,AH-4, with two spatial streams, i.e. one stream for each of CD-A and CD-B. The scheduler treats transmission set $\{CD-C\}_{Tx}$ as a 2-branch MIMO transmission chain i.e. the radio controller and the two transmit access heads AH-6, AH-7, with one spatial stream i.e. the stream for CD-C.

After mapping onto constellation points of the selected modulation scheme, a spatial stream consists of a sequence of 2N (N>0) complex numbers. For CD-A, this is represented as a spatial stream sequence:

$[CD-A]_{SS}=[a_1, a_2, a_3, a_4, \ldots a_i, a_{i+1}, \ldots]$ where $a_i$ is a complex number.

Similarly for CD-B and CD-C:

$[CD-B]_{SS}=[b_1, b_2, b_3, b_4, \ldots b_i, b_{i+1}, \ldots]$ and
$[CD-C]_{SS}=[c_1, c_2, c_3, c_4, \ldots c_i, c_{i+1}, \ldots]$.

Applying a known space-time block coding algorithm to two spatial streams, $[CD-A]_{SS}$ and $[CD-B]_{SS}$, across four space-time streams, i.e. the signals to be transmitted from the four access heads of the transmission set $\{CD-A+CD-B\}_{Tx}$, yields the following sequence of complex number pairs for AH-1:

$[AH-1]_{STS}=[a_1, a_2, a_3, a_4, \ldots a_i, a_{i+1}, \ldots]$.

Similarly for AH-2, AH-3 and AH-4:

$[AH-2]_{STS}=[-a_2^*, a_{1*}, -a_4^*, a_{3*}, \ldots -a_{i+1}^*, a_i^*, \ldots]$ where $a_i^*$ is the complex conjugate of $a_i$,
$[AH-3]_{STS}=[b_1, b_2, b_3, b_4, \ldots b_i, b_{i+1}, \ldots]$ and
$[AH-4]_{STS}=[-b_2^*, b_{1*}, -b_4^*, b_{3*}, \ldots -b_{i+1}^*, b_i^*, \ldots]$.

For CD-C, applying a known space-time block coding algorithm with one spatial stream, $[CD-C]_{SS}$, across two space-time streams, i.e. the signals to be transmitted from the two access heads of the transmission set $\{CD-C\}_{Tx}$, yields the following for AH-6 and AH-7:

$[AH-6]_{STS}=[c_1, c_2, c_3, c_4, \ldots c_i, c_{i+1}, \ldots]$ and
$[AH-7]_{STS}=[-c_2^*, c_{1*}, -c_4^*, c_{3*}, -c_{i+1}^*, c_i^*, \ldots]$ Each symbol of a space-time stream (e.g. $a_i$) is encoded as a pair of signed floating point numbers, one for the real part and one for the imaginary part. The radio controller 710 encapsulates the sequence of floating point number pairs for a given space-time stream inside a packet or frame that is addressed to the corresponding access head. Transmit timing information that is used by each access head to co-ordinate its transmissions with those of the other access heads in the radio cluster 700 may also be included in the packet or frame.

In each access head, the stream of number pairs is extracted from the received packets or frames along with the transmit timing information. At the point in time dictated by the timing information, elements of the space-time stream received from the radio controller 710 are modulated by the access head onto OFDM carriers and transmitted over a radio link to target CDs via the antenna(s) attached to the access head. If an access head or virtual access head is equipped with more than one antenna, the same stream is transmitted over all antennas thus providing local transmit micro diversity but with no addition space-time coding.

Receive Chain Operations (from a Client Device)

Operation of the receive chain will now be described with reference once again to FIG. 8. Based on network access requests that have previously been sent by one or more CDs, the scheduler 615 residing in the radio controller 610 selects a set of one or more CDs that will be allowed to transmit information within a given uplink transmission opportunity. The scheduler 615 also determines which of the performance-enhancing techniques may be applied to the signals received at the access heads from the CDs during this transmission opportunity. The scheduler 615 provides coding instructions to each of the CDs via the access heads 620,670 in a grant that authorises the CDs to transmit its information. A spatial stream for each of the authorised CDs scheduled for contemporaneous transmission along with streams from other authorised CDs is processed by each respective CD to produce a space-time stream. The space-time stream is then modulated onto the OFDM carriers and transmitted over the radio link by each respective CD.

The signal is received by the antenna 628 and processed by the OFDM demodulator 624. Once demodulated the received symbols are forwarded by the access head 620 to the radio controller. If more than one access head is allocated to receive the signal from the CD, the other access heads perform similar activities to 620.

The spatial streams originally transmitted by each of the CDs are recovered by the radio controller 610 from the received symbols using its knowledge of pilot and training symbols associated with each of the spatial streams, the channel estimation information provided by each access head, and known space-time decoding and de-multiplexing algorithms in space-time decoder 642.

A reverse mapping from the detected modulation scheme (e.g. 64QAM) is then applied at the digital demodulator 644 to each of the spatial streams to reconstruct the bit stream corresponding to a PHY protocol data unit (PPDU). In some implementations, descrambling and forward error correction is used to extract a MAC protocol data unit (MPDU) 648 from the PPDU at the channel decoder 646.

If forward error correction fails to produce an error-free MPDU from at least one of the spatial streams forwarded by the various access heads, known diversity combining techniques may be used by the radio controller 610 to combine input from all of the streams related to a given CD in an attempt to reconstruct an error-free MPDU. If an error-free MPDU is received or reconstructed, it is passed to a higher-layer MAC function for processing; otherwise, error recovery procedures beyond the scope of this invention are initiated.

Figure 10:
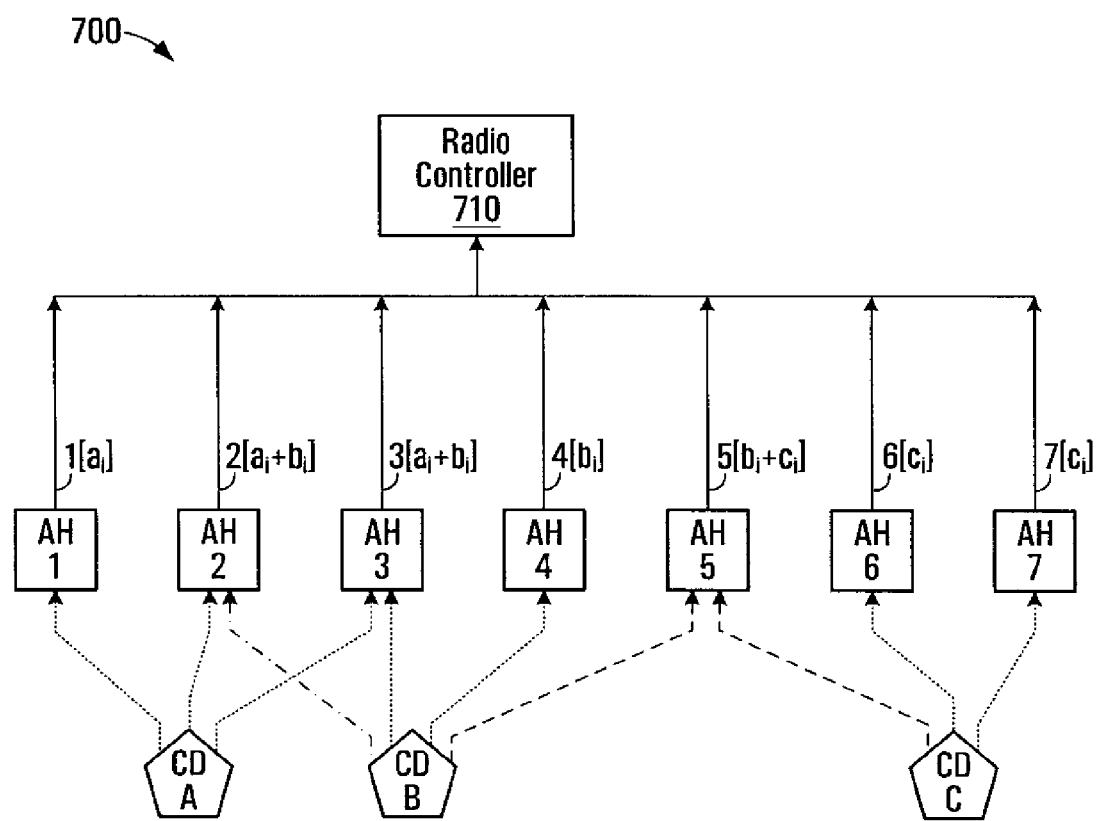
FIG. 10 is a schematic diagram of uplink transmission in an example radio cluster including a radio controller, multiple access heads and multiple client devices.

A particular example of receiving a transmission will be described with references to FIGS. 9 and 10. The radio controller 710 assumes that the serving set for each of the CDs is the same as that used for its downlink transmissions in FIG. 9. Referring to FIG. 10, the assumed serving sets will be:

{CD-A}$_{\sim serving}$={AH-1, AH-2, AH-3}
{CD-B}$_{\sim serving}$={AH-2, AH-3, AH-4}
{CD-C}$_{\sim serving}$={AH-6, AH-7}

Because the assumed serving sets for CD-A and CD-B overlap, the radio controller assumes that their reception set will be:

{CD-A+CD-B}$_{\sim Rx}$={AH-1, AH-2, AH-3, AH-4}

The radio controller 710 instructs CD-A and CD-B (and CD-C) regarding multiple issues including, but not limited to, when to begin transmission, which space-time coding sequence each CD should use to encode their pilot symbols and the cyclic shift that each should apply to their training symbols. For example, the spatial stream sequence for CD-A will be:

[CD-A]$_{SS}$=[$a_1, a_2, a_3, a_4, \ldots a_i, a_{i+1}, \ldots$]

with pilot symbols:

[CD-A]$_{PS}$[$p_{A1}, p_{A2}, p_{A3}, p_{A4}, \ldots p_{Ai}, p_{Ai+1}, \ldots$].

Similarly, the sequence for CD-B will be:

[CD-B]$_{SS}$=[$b_1, b_2, b_3, b_4, \ldots b_i, b_{i+1}, \ldots$]

with pilot symbols:

[CD-B]$_{PS}$=[$p_{B1}, p_{B2}, p_{B3}, p_{B4}, \ldots p_{Bi}, p_{Bi+1}, \ldots$].

The assumed reception set for CD-C does not overlap with those of CD-A and CD-B, i.e.:

{CD-C}$_{\sim Rx}$={CD-C}$_{\sim serving}$={AH-6, AH-7}.

The (non-interfering) spatial stream sequence for CD-C will be:

[CD-C]$_{SS}$=[$c_1, c_2, c_3, c_4, \ldots c_i, c_{i+1}, \ldots$]

with pilot symbols dictated by the radio controller to be:

[CD-C]$_{PS}$=[$p_{C1}, p_{C2}, p_{C3}, p_{C4}, \ldots p_{Ci}, p_{Ci+1}, \ldots$].

When CD-B transmits, it is determined that the actual reception set for CD-B includes AH-5, but does not include AH-2. Also, it is determined that the actual reception set for CD-C includes AH-5. This change in the actual reception set for CD-B and CD-C as opposed to the assumed reception set may be due to movement of the devices or to a change in the propagation environment caused by obstructers or reflectors, that may or may not be transient. Therefore, the reception set for CD-B turns out to be:

{CD-B}$_{Rx}$={AH-3, AH-4, AH-5}={CD-B}$_{\sim serving}$−{AH-2}+{AH-5}.

Similarly:

{CD-A}$_{Rx}$={AH-1, AH-2, AH-3}={CD-A}$_{\sim serving}$ and
{CD-C}$_{Rx}$={AH-5, AH-6, AH-7}={CD-C}$_{\sim serving}$+{AH-5}.

The spatially multiplexed streams are demodulated from the received OFDM carriers by each of the access heads and converted by each AH into a sequence of complex symbols. At AH-1, the sequence is:

[AH-1]$_{STS}$=[$1_1, 1_2, 1_3, 1_4, \ldots 1_i, 1_{i+1}, \ldots$].

Similarly for AH-2 . . . AH-7:

[AH-2]$_{STS}$=[$2_1, 2_2, 2_3, 2_4, \ldots 2_i, 2_{i+1}, \ldots$]
. . .
[AH-7]$_{STS}$=[$7_1, 7_2, 7_3, 7_4, \ldots 7_i, 7_{i+1}, \ldots$]

Each symbol of a space-time stream (e.g. $2_i$) is encoded as a pair of signed floating point numbers, one for the real part and one for the imaginary part. Each access head encapsulates the sequence of floating point number pairs for its received space-time stream inside a packet or frame that is addressed to the radio controller. Included in the packet or frame may be timing information indicating when the stream was received by the AH and channel estimation information derived by the AH from the received pilot and training symbols.

The radio controller 710 extracts the stream of number pairs from the packets or frames received from each of the access heads and uses the timing information in those packets or frames to time-align the symbols provided by each of the access heads. The spatial streams originally transmitted by each of the CDs are recovered by the radio controller 710 from the received symbols using its knowledge of the pilot and training symbols associated with each of the spatial streams, the channel estimation information provided by each access head, and known space-time decoding and de-multiplexing algorithms. Thus:

[1]$_{STS}$→[A]$_{SS}$
[2]$_{STS}$→[A]$_{SS}$
[3]$_{STS}$→[A]$_{SS}$[B]$_{SS}$
[4]$_{STS}$→[B]$_{SS}$
[5]$_{STS}$→[B]$_{SS}$+[C]$_{SS}$
[6]$_{STS}$→[C]$_{SS}$
[7]$_{STS}$→[C]$_{SS}$

A reverse mapping from the detected modulation scheme (e.g. 64QAM) is then applied to each of the spatial streams to reconstruct the bit stream corresponding to a PHY protocol data unit (PPDU). In some implementations, descrambling and forward error correction is used to extract a MAC protocol data unit (MPDU) from the PPDU.

In some embodiments, the radio controller 710 updates the serving set for each CD with the list of access heads reporting a spatial stream for that CD:

{CD-A}$_{serving}$={CD-A}$_{Rx}$={AH-1, AH-2, AH-3}
{CD-B}$_{serving}$={CD-B}$_{Rx}$={AH-3, AH-4, AH-5}
{CD-C}$_{serving}$={CD-C}$_{Rx}$={AH-5, AH-6, AH-7} and uses these sets for subsequent downlink transmission opportunities.

Numerous modifications and variations of the present invention are possible in light of the above teachings. It is therefore to be understood that within the scope of the appended claims, the invention may be practised otherwise than as specifically described herein.

The invention claimed is:

1. A method that provides a split physical (PHY) layer scheme for use in a multiple input multiple output (MIMO)-based wireless network, the method comprising:
   in a centralized manner, performing at least some physical (PHY) layer functionality at a radio controller, the radio controller transmitting data to a plurality of remote access heads;
   in a distributed manner, performing at least some PHY layer functionality of the same type at each of the plurality of remote access heads, which is distinct from the at least some physical PHY layer functionality performed in a centralized manner; and
   transmitting the data from at least two of the plurality of remote access heads to a client device to establish multiple paths between the client device and the radio controller to facilitate recovery of the data transmitted by the radio controller at the client device,
   wherein:
      performing at least some PHY layer functionality in a centralized manner comprises performing MIMO space-time coding/decoding; and
      performing at least some PHY layer functionality in a distributed manner comprises performing analog modulation/demodulation.

2. The method according to claim 1 further comprising:
in a centralized manner, performing at least some media access control (MAC) layer functionality.

3. The method according to claim 1 further comprising, in a centralized manner, performing at least one of:
scheduling of transmissions; and
selecting at least one technique from a set of techniques for processing a transmit/receive signal.

4. The method according to claim 1 wherein performing analog modulation/demodulation comprises performing orthogonal frequency divisional modulation (OFDM) modulation/demodulation.

5. The method according to claim 1 further comprising in a centralized manner, providing synchronization signals to control the timing of wireless transmissions.

6. The method according to claim 1 wherein performing at least some PHY layer functionality in a centralized manner comprises performing processing of a transmit signal according to at least one of the following techniques:
 a) macro-transmit diversity;
 b) spatial reuse; and
 c) spatial multiplexing.

7. The method according to claim 1 wherein performing at least some PHY layer functionality in a centralized manner comprises performing processing of a receive signal according to at least one of the following techniques:
 a) macro-receive diversity;
 b) spatial reuse; and
 c) spatial multiplexing.

8. The method according to claim 1, wherein each remote access head has a coverage pattern, the method further comprising:
providing an overall coverage pattern formed collectively by the coverage patterns of each of the plurality of remote access heads that is configured for one or more of:
 tailoring the wireless coverage to the localized area provided by the plurality of remote access heads to a desired size and shape;
 providing more uniform Signal and Interference and Noise Ratio (SINR) across containment region;
 minimizing undesirable signal leakage to areas outside of the containment region;
 dynamically selecting a subset of the plurality of remote access heads during each transmission/receive opportunity in order to minimize frame error rate and/or to maximize throughput.

9. A multiple input multiple output (MIMO)-based wireless network system comprising at least one radio cluster, the radio cluster comprising:
a radio controller configured to perform at least some physical (PHY) layer functionality in a centralized manner and to transmit data to each of a plurality of remote access heads;
wherein each remote access head is configured to perform at least some PHY layer functionality of the same type and that is distinct from that which the radio controller is configured to perform and transmit the data received from the radio controller to a client device to establish multiple paths between the client device and the radio controller via different remote access heads to facilitate recovery of the data transmitted by the radio controller at the client device,
and wherein:
 the at least some PHY layer functionality performed by the radio controller comprises MIMO space-time coding/decoding; and
 the at least some PHY layer functionality performed by one or more of the plurality of remote access heads comprises analog modulation/demodulation.

10. The system according to claim 9 wherein the radio controller is configured to perform, in a centralized manner, one or more of:
scheduling transmission and receipt of packets; and
selecting at least one technique from a set of techniques for processing a transmit/receive packet.

11. The system according to claim 9 wherein the analog modulation/demodulation comprises orthogonal frequency divisional modulation (OFDM) modulation/demodulation.

12. The system according to claim 9 wherein the radio controller communicates with the plurality of remote access heads using wired or unwired network links wherein:
wired network link protocols include one or more of Ethernet, Infiniband, frame relay, and Asynchronous Transfer Mode (ATM); and
unwired network link protocols include one or more of IEEE 802.11, IEEE 802.16, Ultra Wide Band (UWB), and point-to-point microwave.

13. The system according to claim 9 wherein the radio controller is configured to provide synchronization signals to the plurality of remote access heads to control the timing of wireless transmissions.

14. The system according to claim 9 wherein for communications transmitted to or received from the plurality of remote access heads, the radio controller is configured to perform processing of a transmission or received signal according to at least one of the following techniques:
 a) macro-transmit diversity;
 b) macro-receive diversity;
 c) spatial reuse for one or both of a transmit signal and a receive signal;
 d) spatial multiplexing for one or both of a transmit signal and a receive signal; and
 e) some combination thereof.

15. The system according to claim 9 wherein the multiple input multiple output (MIMO)-based wireless network system is configured to operate in any one of:
a wireless local area network;
a wide area cellular network; and
a wireless room-area network.

16. The system according to claim 9 wherein for a given radio cluster, each remote access head of the plurality of remote access heads is connected to the radio controller:
directly via a point-to-point connection; or
indirectly via a fan-out arrangement through one or more other remote access heads.

17. The system according to claim 9 wherein the at least one radio cluster operates as a single frequency network.

18. The system according to claim 9 wherein when the system includes more than one radio cluster and each radio cluster operates as a single frequency network, the system utilizes a frequency plan in allocating which radio clusters use which frequencies.

19. The system according to claim 9 further comprising a network link between the radio controller and each of the plurality of remote access heads, the network link configured to provide one or more of:
facilities to transmit packets between the radio controller and each remote access head of the plurality of remote access heads;
synchronization signals to be transmitted by the radio controller to each remote access head of the plurality of remote access heads; and
electrical power to be provided by the radio controller to at least one remote access head of the plurality of remote access heads.

* * * * *